Dec. 30, 1969   B. BARNETT ET AL   3,487,410
SCREENING FOR ENGINES
Filed Jan. 8, 1968   3 Sheets-Sheet 1
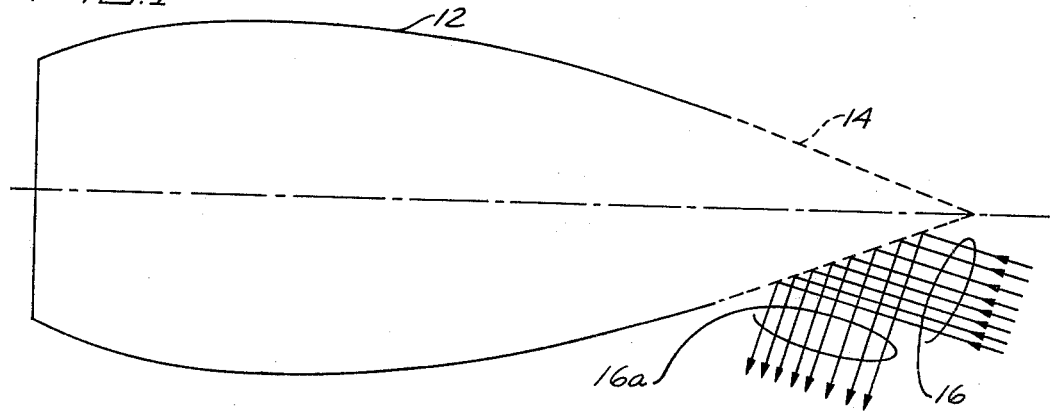
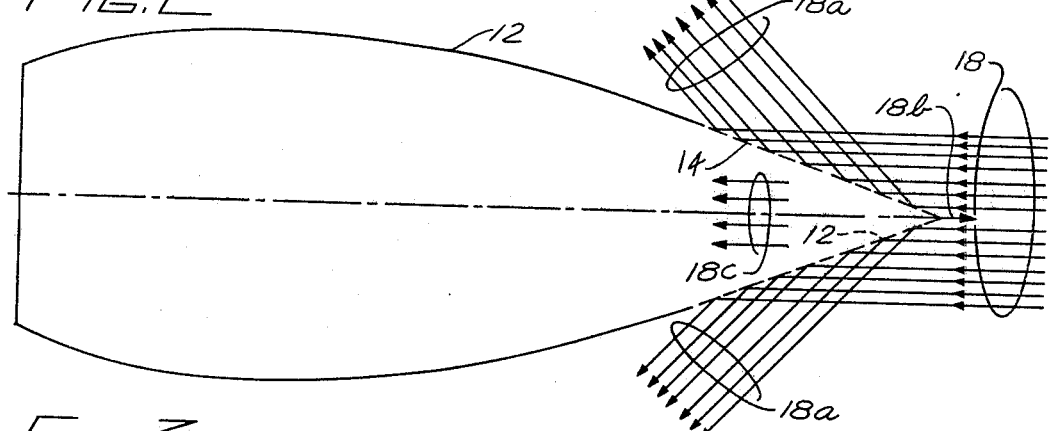
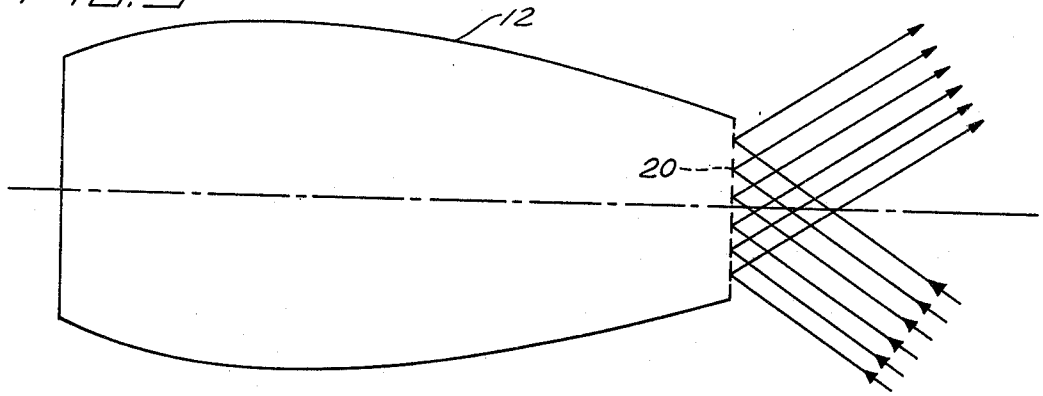
INVENTORS.
BURTON BARNETT
MARTIN R. KINSLER
BY
*Sidney Magnes*
Agent Dec. 30, 1969  B. BARNETT ET AL  3,487,410
SCREENING FOR ENGINES
Filed Jan. 8, 1968  3 Sheets-Sheet 2

INVENTORS.
BURTON BARNETT
MARTIN R. KINSLER
BY
Sidney Magnes
Agent

Dec. 30, 1969  B. BARNETT ET AL  3,487,410

SCREENING FOR ENGINES

Filed Jan. 8, 1968  3 Sheets-Sheet 3

INVENTORS.
BURTON BARNETT
MARTIN R. KINSLER
BY
Sidney Magers
Agent

United States Patent Office 3,487,410
Patented Dec. 30, 1969

3,487,410
SCREENING FOR ENGINES
Burton Barnett, Los Alamitos, and Martin R. Kinsler, Los Angeles, Calif., assignors to North American Rockwell Corporation, a corporation of Delaware
Filed Jan. 8, 1968, Ser. No. 697,561
Int. Cl. G01s 7/36; H01q 15/18
U.S. Cl. 343—18                                    6 Claims

ABSTRACT OF THE DISCLOSURE

An arrangement for reducing the radar cross section of an opening by placing a suitably shaped and dimensioned screen over the opening. The screen preferably takes the configuration of an externally-positioned convex, such as a dome or a cone, whose spacing between strands is of the same order of magnitude as the wavelength of the impinging radar energy. This type of screen configuration operates in such a manner that the amount of radar-energy reflected back to the radar station is appreciably smaller than if no screen were used.

BACKGROUND

It is well known that objects such as airplanes, ships, and the like can be detected by means of "RADAR"; this term being an acronym for RAdio Detection And Ranging. A radar system uses an antenna for emitting radio waves; these waves impinging upon an airplane, ship, etc.; and being reflected back, as a radar "return," to the radar station. Here an antenna picks up the reflected radio signals; and from a knowledge of the antenna orientation and of the time-interval between the emission of the original waves and the reception of the reflected waves, the location and distance (range) to the reflecting body may be computed and/or displayed. In this way, radar may be used to detect and obtain the range of objects.

It is known that optimum reflection of "radar energy" occurs when a planar reflective surface is substantially perpendicular to the impinging radiation, this situation being somewhat analogous to the operation of a mirror—and thus producing a so-called "specular" reflection. For example, a sphere—which theoretically has only one point perpendicular to the impinging radar energy—would theoretically produce a radar-return by reflecting the radiation at that one point; and—because of the single, small, specular reflection—would be described as having a small "radar cross section," regardless of its actual physical size. On the other hand, bodies—such as airplanes—have relatively few planar surfaces; but do have a plurality of multi-curved surfaces. Therefore the impinging radar energy is reflected from a plurality of relatively-small curved areas that happen to be perpendicular to the impinging radiation—the plurality of specular reflections producing a medium-sized radar cross section. Similarly, a ship—with a plurality of planar surfaces, masts, smoke stacks, antennas, and the like—has a larger plurality of widely separated areas that happen to be perpendicular to the impinging radio waves; and since each of these areas reflects some of the impinging radiation, the ship would be described as having a relatively large radar cross section.

It would appear, from cursory considerations, that a cavity—such as a rocket engine—would have a small radar cross section; but it turns out that this is not true. On the contrary, the impinging radar energy enters the opening of the cavity; bounces back and forth therein; and then emerges from the cavity—some of the emergent energy being directed back toward the radar station. Moreover, the cavity acts in this same manner for practically all radar frequencies (to be discussed later).

As a result, a relatively small cavity returns a disproportionately large amount of radar energy back to the radar station; and thus is described as having a large radar cross section—whereas in actuality it may have a small physical opening. At the radar station, the large return from the cavity indicates the presence of a radar-reflecting body; and, because of the relatively high strength of the return, the direction and range of the cavity-carrying body can be quickly and accurately determined.

Practically all present-day airplanes use a plurality of jet engines; each engine having an intake opening and an exhaust opening—so that each jet engine acts as a radar-reflecting cavity that has a front-opening and a rear-opening. As a result, the engine—or combination of engines—coact in such a manner as to produce a large radar cross section. Under certain conditions this is desirable, as—for example—when an airport control-tower is to monitor incoming and departing aircraft. However, under other conditions, it may be desired that the aircraft have minimal radar cross sections, as—for example—when a control-tower does not want its radar-display cluttered by radar returns from departing aircraft; or when the aircraft wants to remain undetected. Thus, for some conditions, the apparent radar cross section should be minimal in order to reduce the amount of "threat" radar radiation that is reflected to radar-utilizing facilities—the term "threat" radar being construed to include externally-produced radar radiations from friendly monitoring stations.

Many attempts have been made to minimize radar reflections; one of the most effective being the use of "Radar Absorbing Material" (RAM) that absorbs the impinging radar radiation—and thus minimizes the reflection back to the radar station. Radar-absorbing-materials, structure, and principles of operation are described in a number of publications—among them being U.S. Patent 3,349,397 entitled "Flexible Radiation Attenuator" and filed by J. R. Rosenthal. These radar absorbing materials have three serious defects. The first is that they are limited in their capability to withstand the high temperatures generally associated with the operation of jet engines. The second defect is that their structure becomes extremely complex, particularly as the frequency of the impinging radar-energy is varied over a large range. Thirdly, RAM materials tend to be quite heavy. Therefore, it becomes extremely desirable to provide improved means for minimizing the radar cross-section of a cavity, preferably by means that will overcome some or all of these RAM disadvantages.

OBJECT AND DRAWINGS

It is therefore an object of the present invention to provide an improved way of decreasing the radar cross section of a cavity.

The obtainment of this object, and others, will be realized from the following detailed description taken in conjunction with the drawings of which:

FIGURES 1 and 2 show how an externally-located cone-shaped screen may be used to reduce radar cross sections;

FIGURE 3 shows how a planar screen positioned at an opening may be used to reduce radar cross sections;

INTRODUCTION

Figure 4:
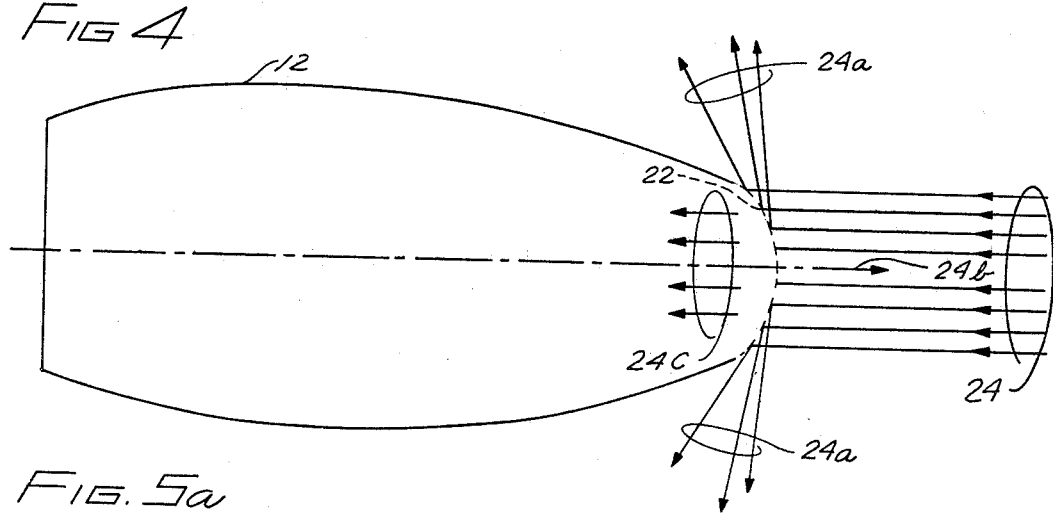
FIGURE 4 shows how an externally-located dome-shaped screen may be used to reduce radar cross sections.

It is well known that radio waves, radar radiations, etc. are reflected by various materials—among the best reflectors being sheets or films of metal. Under these reflective conditions, none of the radiations pass through the reflecting material; and the materials are designated as being "opaque" to the impinging radiations. Assume now that the impinging radiations have a given frequency, and that the sheet of metal is replaced by a screen having extremely minutely-sized pores. It has been found that the minutely-pored screen is still opaque to the radiation, and still reflects the impinging radiation in the same manner as the continuous film or sheet.

Assume now that the minutely-pored screen is successively replaced by screens of progressively-larger pore-size. Eventually a particular screen having given sized pores will begin to transmit some of the impinging radiation, i.e., it will be partially "transparent" to the impinging radiation. Screens having progressively larger-sized pores will be progressively more transparent, until—at a given pore-size—practically all the impinging radiation will be transmitted; increasing the pore-size will not produce any additional transparency.

The transition range between screen-opacity and screen-transparancy occurs while the pore-size is increasing from about one-tenth the size of the wavelength of the impinging radiation to about ten-times this wavelength; a condition that is explained by saying that the pore-size is of the same "order of magnitude" as the wavelength.

SYNOPSIS

The present invention relates to the use of screens for minimizing the large radar cross section of a cavity, such as a jet engine. To achieve this result, the screen is made radar-reflective by use of a pore-size, or strand-spacing, that is of the same order-of-magnitude as the wavelength of the radiation of interest; and the screen is preferably formed into a convex shape that is positioned externally of the opening whose radar cross section is to be minimized.

In a manner to be discussed subsequently, the screen pore-size and screen configuration coact to diffusely reflect impinging radar energy; so that only a very small percentage of the radar energy impinging onto the screen is reflected back to the radar station. Moreover, that portion of the radar energy which actually traverses the screen, and enters the cavity, eventually emerges from the cavity to find its path barred by a radar-reflective screen—so that much of this emergent energy is reflected back into the cavity, and eventually absorbed there. Thus, the disclosed structure produces a much smaller radar return—in this way reducing the radar cross section of the cavity.

DETAILED DESCRIPTION

Referring now to FIGURE 1, there is illustrated an external shell 12 of a jet engine, having a tail-screen 14. As indicated previously, when screen 14 has suitably-small pores, it acts as a reflector of impinging radar waves.

FIGURE 1 shows a bundle 16 of radar waves impinging onto externally-positioned tail-screen 14, which is illustrated as being cone-shaped. As indicated previously, the screen's pore-size is quite small; and, because of the screen's convex-positioning and cone-shape, most (16a) of the impinging radar waves are reflected away from the radar station. Since radar-bundle 16 is impinging at an angle to tail-screen 14, and because of the screen's convex-positioning and cone-shape, there is a downward reflection (16a) as shown. There are also a plurality of un-illustrated upward and sideward reflections—the overall reflection pattern producing what may be called "diffuse" reflection.

If the impinging radiation 16 happened to impinge perpendicularly onto a surface element of tail-screen 14, the illustrated downward reflection 16a would become a reflection back to the radar station; this reflection tending to be "specular," and to take the form of a line. However, the line-reflection—which is still much weaker than the reflection produced by a cavity—indicates a body having a relatively small radar cross section.

Referring now to FIGURE 2, there is illustrated a bundle 18 of radar waves impinging axially onto tail-screen 14. This axial impingement may be conveniently divided into three parts: (I) a diffusely-reflected portion 18a, as previously discussed; (II) a small radar return (18b) reflected from the tip of tail-screen 14; and (III) radiation (18c) that is transmitted through the screen into the cavity of the jet engine. The extremely small portion (II) that impinges axially onto the tip of cone-shaped tail-screen 14 is specularly reflected back to the radar station as radar-return 18b; and at the radar station, the weak axial "return" 18b indicates, at best, one or a plurality of bodies having extremely small radar cross sections. The third portion (III) of impinging radar waves traverses tail-screen 14; and enters the cavity, as indicated at 18c. This transmitted radiation undergoes multiple reflections within the cavity, becoming weaker at each reflection; and eventually emerges from the cavity, to now impinge onto the inner surface of tail-screen 14. Here again, depending upon the angular relation between the emerging radiation and the screen, a small portion is transmitted outwardly; and the rest is reflected back into the cavity—where it again undergoes attenuating multiple reflections. In this way, most of the axial impinging radiation is reflected and/or absorbed; thus weakening the radar return.

To recapitulate, most of the impinging radar energy is diffusely reflected away from the radar station; a small amount of radar energy is actually reflected by the cavity; and a minute amount of radar energy is specularly reflected. The reduced radar return produced by the disclosed structure is in marked contrast to the radar reflection that would ordinarily be produced by cavity 12; since the normal cavity-reflection would ordinarily indicate a body having a large radar cross section. The resultant small radar cross section is of course more difficult to detect, more difficult to track; and makes it more difficult to determine the vehicle's range.

Referring again to FIGURE 2, the following discussion will be helpful in understanding the radar-reflecting operation. Assume that tail-screen 14 has a pore-size that is, for example, about one-quarter the wavelength of the impinging radar energy—thus falling into the indicated size-range. Under this condition, the marginal portion of radiation-bundle 18 impinges obliquely onto the side-portions of the tail-screen 14; and, due to this angular orientation of the tail-screen relative to the impinging radiation, the impinging radiation will "see" pores of even smaller-than-true size—which produce an even more-reflective screen. As a result, diffuse reflection will be even more efficient than indicated above, and as much as ninety-five percent of the impinging radiation will be reflected away from the radar station.

It is apparent that the long tapering tail-cone configuration 14 of FIGURES 1 and 2 approaches an ideal design; as its large area offers minimal impedance to the flow of jet-engine gases, its angularity enhances its reflectivity, and its sharp tip minimizes radar return. However, a planar screen 20 of FIGURE 3—placed across the throat of the opening—also reflects away all radiation, except axial, and provides weight savings.

On the other hand, a dome-shaped screen such as 22 of FIGURE 4 may—in many cases—be an optimal compromise. Here, a bundle 24 of axial radar waves is shown as impinging onto a convexly-positioned dome-shaped tail-screen 22. The outer portions of bundle 24 impinge onto screen 22 at various angles (depending on their point of impingement) and are reflected by the scheen in a diffuse manner, as indicated at 24a. However, the central portion of bundle 24 impinges substantially perpendicularly onto screen 22; and this portion 24b will be specularly reflected as a radar-return. As discussed above, a small amount 24c of the impinging radiation will be transmitted by screen 22; and this portion will undergo multiple reflections and emission as previously explained.

Thus, a dome-shaped screen may be a compromise between a cone-shape and a planar-shape—its diffuse reflection, specular reflection, radar transmission, weight, and gas-flow impedance permitting a range of tradeoffs.

It is well known that radar stations often use a plurality or a range of radar wavelengths, often switching from one wavelength to another. From a radar-absorbing-material point of view, this means the RAM must be effective over an appreciable range of wavelengths; the longer radar wavelengths causing the most difficulty—and leading to larger, heavier, and more-complex RAM structures. Therefore, longer-wavelength radar is finding wider acceptance.

Referring back to the previous discussion, it will be recalled that the subject screens have "pores" that may be dimensioned to be about one-quarter of a wavelength. As will be discussed later in greater detail, the screens are preferably made of wires spaced apart by a suitable distance. Thus, for use against a multi-wavelength radar-station, it is only necessary to make the screen's pore-size about one-quarter the size of the shortest wave-length. Under this condition the screen's pore-size will automatically be smaller than one-quarter of the longer radar-wavelengths; and the screen will therefore be highly reflective for these longer-wavelength radiations. This inherent advantage against radar-wavelengths is, however, offset by the disadvantage of reducing the screen's porosity to gas-flow through it.

It is recognized that much of the impinging radar radiation is diffusely reflected, so some radar installations use separate, remotely-located transmitters and receivers. For example, referring back to FIGURE 1, it is apparent that reflected radiation 16a will not be reflected back to the radar-station from which it originated; but could be reflected to a radar-receiver below and to the left of cavity 12. Here too, the longer-wavelength radar is finding wider acceptance.

Figure 5A:
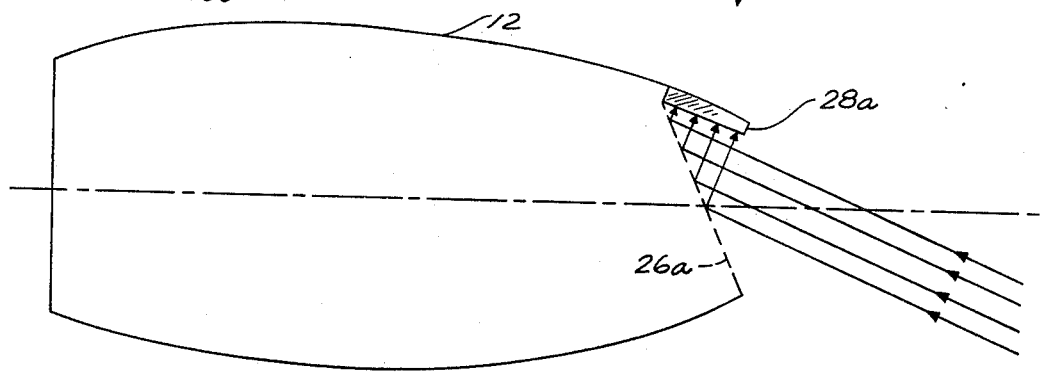
FIGURES 5a and 5b show how a screen and a radar-absorbing material may cooperate to reduce radar cross sections.
Figure 5B:
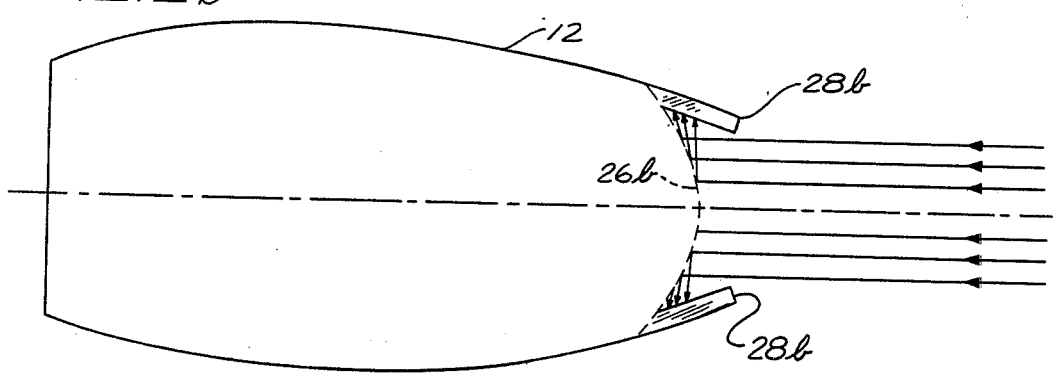

This problem can be solved by teaming-up the present screen-concept and the prior-art RAM concept, for use against longer-wavelength radar radiations; and FIGURES 5a and 5b show arrangements for achieving the desired result. In FIGURE 5a, cavity 12 contains a large-pore screen 26a, which reflects the longer-wavelength radar energy to radar-absorbing-material 28a, this being located at a relatively cool portion of the engine. In FIGURE 5b, screen 26b takes the form of a dome; and the radar-absorbing-material 28b takes the form of a toroid. Due to the high screen-porosity, the gas-flow is relatively unimpeded; and the RAM material is concentrated at a location where the temperature is low enough for its operation—the disclosed structure thus reducing the radar cross section for a range of radar-wavelengths.

Figure 6:
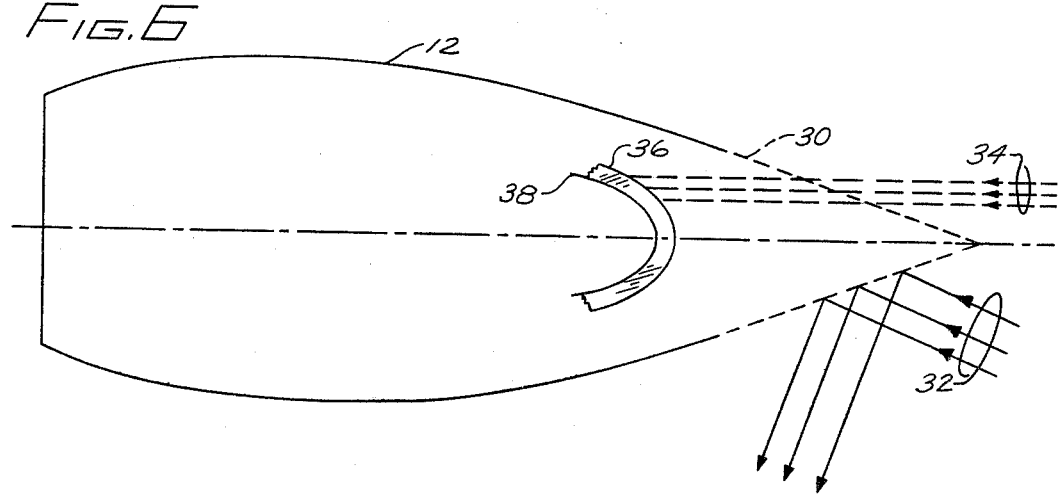
FIGURE 6 shows how one or more screens may be used to separate different-frequency radiations; and to treat each in a separate manner.

FIGURE 6 illustrates another way of taking advantage of this characteristic. Here a screen 30 has a relatively-large pore-size that reflects long-wavelength impinging radar energy, 32; but transmits short-wavelength radar energy, 34. Thus, the large-pored screen provides minimal gas-flow impedance; and diffusely reflects the longer wavelength radiation. Mealwhile, the shorter-wavelength radiation, 34, impinges upon suitable RAM material 36 positioned on the rearward end of the turbine diffuser 38 of the conventional jet engine—where it is absorbed. This type of wavelength-separation may be used to cause certain types of radar energy to be diffusely reflected, to cause other types to be specularly reflected, to direct still other types to RAM having selected properties, etc.

Figure 7:
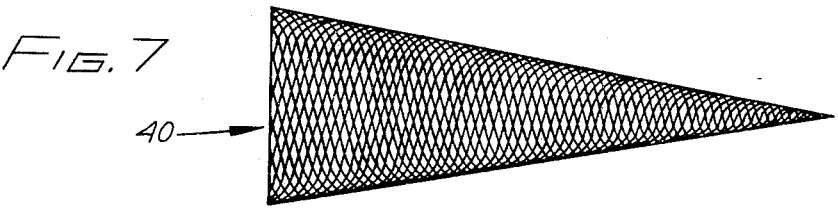
FIGURES 7, 8, and 9 show different types of screens.

FIGURE 7 shows one structure for a cone-shaped screen 40. This is made of screening of the type known as "carpenter-cloth," 40, which has substantially rectangular openings of selectable size. This carpenter-cloth may be cut and wound in such a way as to produce a cone of desired size, shape, taper, and dimensions; the ends being suitably fastened to provide a substantially uniformly-pored screen.

Figure 8:
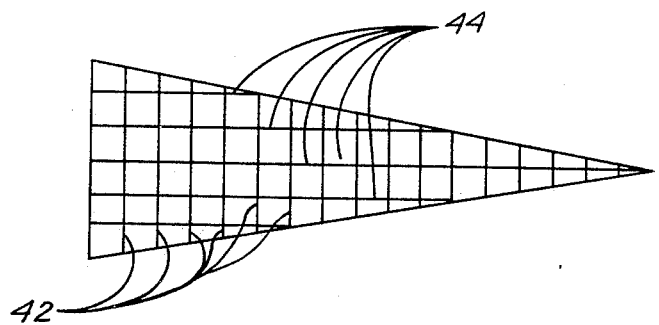

FIGURE 8 shows another type of screen having substantially uniformly-shaped pores; this screen having equi-distant and transversely-placed wires 42, and equi-distant horizontally-placed longitudinal wires 44—each horizontally-shown wire looping back on itself to define a plane. The wires, of course, are properly spaced to achieve the desired porosity.

Figure 9:
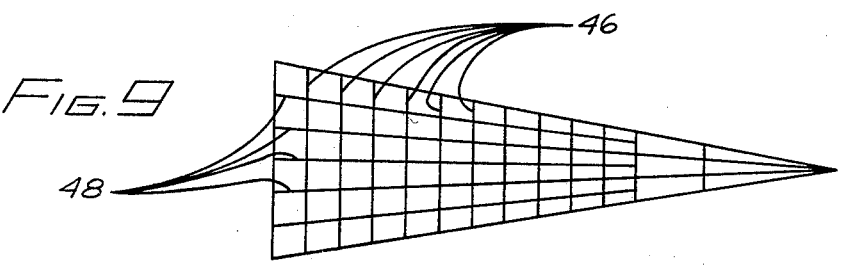

FIGURE 9 shows another form of screen wherein equally-spaced transverse-wires 46 intercept longitudinal wires 48 that converge toward the tip of the cone. In this embodiment, the size of the pores tends to decrease toward the apex of the cone. The inherent structure of this cone is such that—in the tip portion—due to the plurality of wires crowded into relatively small space, the reflectivity and the gas-flow impedance both tend to increase. This effect may be overcome by terminating alternate longitudinal wires, and using suitably spaced transverse wires to re-establish the desired pore size.

It is known that the radar waves may be "polarized" in a horizontal, a vertical, a circular, or an elliptical manner. In the past, these polarizations have tended to minimize the effectiveness of certain radar absorbing materials; but in the present case, the screens formed of the wires are such that they have omni-directional random characteristics, so that the type of impinging polarization does not have any effect upon the reflecting ability of the screens.

It is obvious that a similar screened reflection and absorption approach can be used at engine inlets and engine exhausts; although exhaust-positioned screens have less detrimental aerodynamic effects. However, the tail-screen will be exposed to a different type of environment than the nose-screen; this being caused by the fact that gases leaving a jet engine have a different composition, velocity, temperature, etc. than those gases that enter the jet engine. Therefore, the materials forming the screen are chosen to withstand the temperature, pressure, environment, etc. to which they are exposed; and the joining of the various wires of the screen take this environment into consideration. Thus, certain screen materials may be brazed, others may be welded, and still others may use adhesives. Also, where desired, the cross section of the wires may be circular, rectangular, triangular, or streamlined, depending upon the aerodynamic requirements of that particular location.

Although the invention has been described and illustrated in detail, it is to be clearly understood that the same is by way of illustration and example only, and is not to be taken by way of limitation; the spirit and scope of this invention being limited only by the terms of the appended claims.

What is claimed is:

1. In combination:
   means, comprising a single-layer screen whose pore-size is the same order of magnitude as the wavelength of a threat-radar radiation, for producing a threat-radar radiation reflector;
   said screen having a configuration adapted to reflect substantially all of said impinging threat-radar radiation in such a manner as to minimize the amount of the impinging threat-radar radiation reflected in a given direction;
   said reflector means being positioned athwart the opening of a cavity for reflecting away said threat-radar radiation, and thus minimizing the amount of threat-radar radiation entering said cavity and being emitted therefrom;
   a radar-absorbing material mounted adjacent said cavity, said reflector means comprising a screen positioned to reflect threat-radar radiation to said radar absorbing material.

2. In combination:
   means, comprising a single-layer screen whose pore-size is the same order of magnitude as the wavelength of a threat-radar radiation, for producing a threat-radar radiation reflector;

said screen having a confiuration adapted to reflect substantially all of said impinging threat-radar radiation in such a manner as to minimize the amount of the impinging threat-radar radiation reflected in a given direction;

said reflector means being positioned athwart the opening of a cavity, for reflecting away said threat-radar radiation, and thus minimizing the amount of threat-radar radiation entering said cavity and being emitted therefrom;

a toroid of radar-absorbing material mounted adjacent said cavity, said reflector means comprising a screen positioned to reflect threat-radar to said radar-absorbing material.

3. In combination:

means, comprising a single-layer screen whose pore-size is the same order of magnitude as the wavelength of a threat-radar radiation, for producing a threat-radar radiation reflector;

said screen having a configuration adapted to reflect substantially all of said impinging threat-radar radiation in such a manner as to minimize the amount of the impinging threat-radar radiation reflected in a given direction;

said reflector means being positioned athwart the opening of a cavity, for reflecting away said threat-radar radiation, and thus minimizing the amount of threat-radar radiation entering said cavity and being emitted therefrom;

said reflector means comprising a relatively coarse-pored screen for reflecting longer-wavelength threat-radar radiations, and inherently transmitting shorter-wavelength radiation; and means, comprising shorter-wavelength radar-absorbing material positioned interiorly of said cavity, for absorbing said shorter-wavelength threat-radar radiation transmitted through said screen.

4. The combination of claim 3 wherein said radar-absorbing material is positioned on the diffuser portion of a jet engine.

5. In combination:

means, comprising a single-layer screen whose pore-size is the same order of magnitude as the wavelength of a threat-radar radiation, for producing a threat-radar radiation reflector;

said screen having a configuration adapted to reflect substantially all of said impinging threat-radar radiation in such a manner as to minimize the amount of the impinging threat-radar radiation reflected in a given direction;

said reflector means being positioned athwart the opening of a cavity, for reflecting away said threat-radar radiation, and thus minimizing the amount of threat-radar radiation entering said cavity and being emitted therefrom;

said reflector means comprising two screens having individual pore-sizes, for causing each of said screens to reflect a selected threat-radar radiation.

6. In combination with a jet engine having a cavity and an opening leading into said cavity, a higher-temperature area, and a lower-temperature area, the combination for minimizing the radar-return of threat-radar from said engine cavity, comprising:

means, comprising a radar-absorbing material positioned in said lower-temperature area, for minimizing the radar-return from said cavity; and means, comprising a screen having a pore-size of the same order of magnitude as the wavelength of said threat-radar, said screen being positioned in said higher-temperature area, reflecting impinging radar-radiations to said lower-temperature radar-absorbing material.

References Cited

UNITED STATES PATENTS

| | | |
|---|---|---|
| 2,801,411 | 7/1957 | Weinstock. |
| 2,771,602 | 11/1956 | Kuhnhold. |
| 2,898,561 | 8/1959 | Hayes. |
| 3,307,186 | 2/1967 | Straub. |

RICHARD A. FARLEY, Primary Examiner

BRIAN L. RIBANDO, Assistant Examiner